Jan. 18, 1938.　　　　G. PIRICH　　　　2,106,037
GARDEN TOOL
Filed July 13, 1936
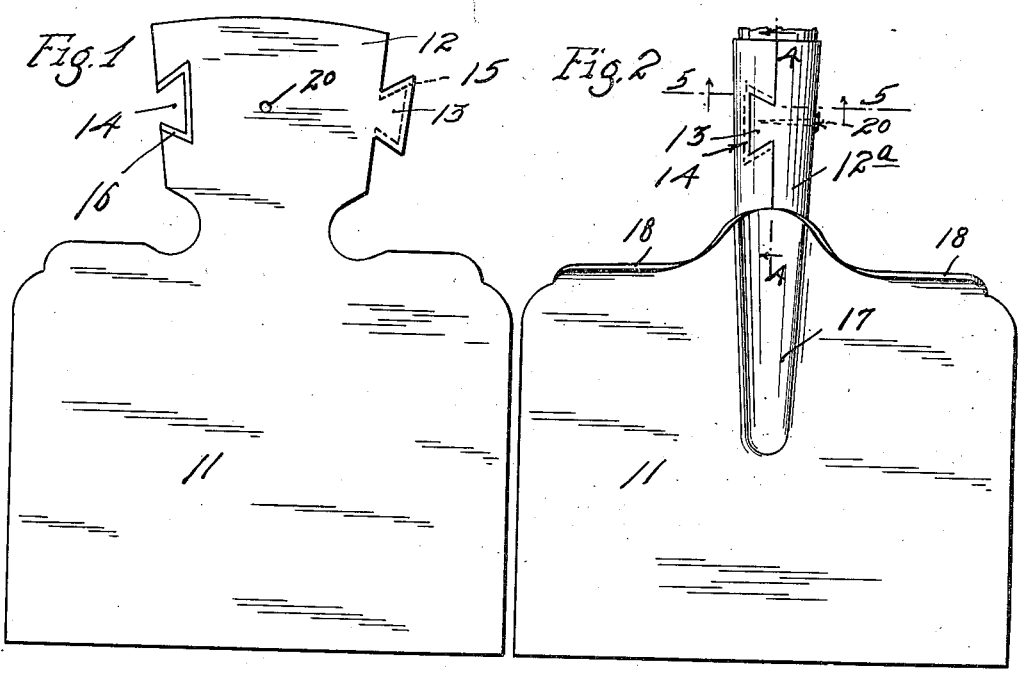
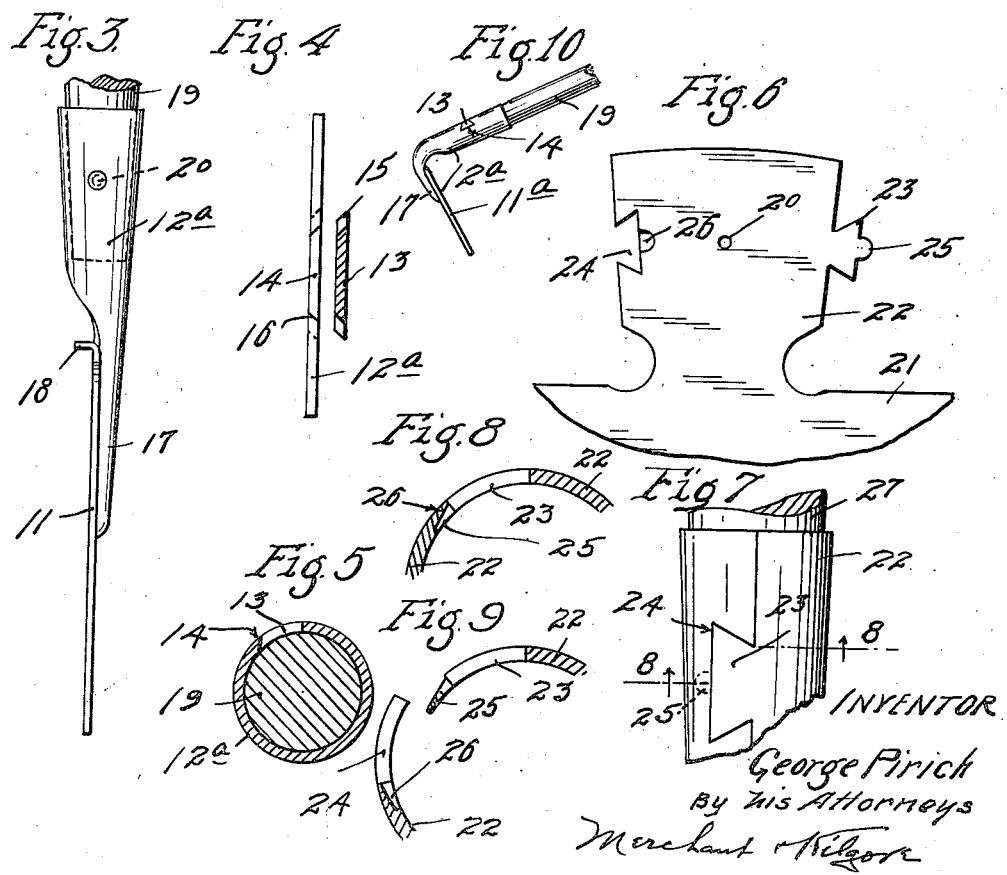
INVENTOR
George Pirich
By his Attorneys
Merchant & Kilgore Patented Jan. 18, 1938

2,106,037

UNITED STATES PATENT OFFICE 2,106,037

GARDEN TOOL

George Pirich, Minneapolis, Minn.

Application July 13, 1936, Serial No. 90,297

2 Claims. (Cl. 306—29)

My present invention relates to garden tools such as scrapers, hoes, rakes, sickles, weeders and the like, and is directed to the provision of an improved handle-receiving socket made from a single piece or sheet of metal and having joined edges that are interlocked against radial, as well as circumferential, separation.

Generally stated, the invention consists of the novel construction, combination and arrangement of parts hereinafter described and defined in the claims. The invention is illustrated in the accompanying drawing wherein like characters indicate like parts throughout the several views.

Referring to the drawing:

Fig. 1 is a plan view showing a flat blank or sheet stamped to form a blade and integral socket in accordance with my invention;

Fig. 2 shows the device bent to final form as required to form a scraper with socket;

Fig. 3 is an edge elevation of the parts shown in Fig. 2;

Fig. 4 is a section taken on the line 4—4 of Fig. 2, but with the ear of the socket pressed laterally out of position;

Fig. 5 is a section taken on the line 5—5 of Fig. 2;

Fig. 6 is a fragmentary view corresponding to Fig. 1, but showing the modified form of the socket-forming portion of the blade, said parts being in flat condition;

Fig. 7 is a fragmentary view showing the socket of Fig. 6 bent into form and a handle or pole inserted into the same;

Fig. 8 is a fragmentary section on the line 8—8 of Fig. 7;

Fig. 9 is a fragmentary view corresponding to Fig. 8 but with the interlocking portions of the sockets separated; and Fig. 10 is a side elevation illustrating the manner in which the blade of the scraper, shown in Figs. 1 to 5, inclusive, may be bent to form a hoe.

Referring first to the structure illustrated in Figs. 1 to 5, inclusive, numeral 11 indicates a flat blade, numeral 12 a flat portion thereof which, when bent, will form the socket. At one edge the socket-forming portion 12 is formed with a dove-tailed ear 13, and at its opposite edge with a co-operating dove-tailed ear-receiving notch 14. The ear 13, at its edges, is beveled, as shown at 15, and the edge of the notch 14 is correspondingly beveled, as shown at 16.

To complete the formation of the scraper, the socket-forming portion 12 is bent into tubular, preferably tapered form, as shown at 12a, and where the socket leads from the blade, the blade is bulged or bent to form a reinforcing shank 17. Also, the upper edge of the blade is turned slightly, as shown at 18, but form a stiffening rib that runs into and forms a continuation of the lower ends of the wings of the formed socket.

When the tool is formed as just described and the beveled dove-tailed ear 13 is seated in the beveled dove-tailed notch 14, the joined wings or edges of the socket will not only be interlocked against circumferential expansion, but also against radial expansion. This double interlocking of the edges of the socket is due partly to the dove-tailed form of the ear and seat, but also to the beveled or over-and-underlapping of the edges or abutting portions of the ear and seat.

It may be stated that to form a hoe of the device just described, it is only necessary to bend the blade 11, as shown at 11a in Fig. 10. In Figs. 1 to 5, inclusive, and in Fig. 10, the pole or handle is indicated at 19. When a tapered end of a handle or pole is tightly driven into the tapered socket formed as just described, the socket will be subjected to very great expanding pressure, but the edges of the socket will be so firmly interlocked that they cannot be separated, either by circumferential or radial force. This makes unnecessary the use of strong rivets or the like to assist in holding the socket against expansion, and except for the tendency of the handle to work out of the socket, no rivet or other securing device would be required. However, to prevent the handle from working loose, a nail or the like may be driven into the handle through a hole 20 provided in the socket.

The construction illustrated in Figs. 6 to 9, inclusive, differs from that illustrated in the other views in detail in the following respects: The blade 21, which corresponds to the blade 11, is provided with a socket-forming portion 22 that corresponds to the socket-forming portion 12. One edge of the socket-forming portion 22 is formed with a dove-tailed ear 23 that will fit a dove-tailed notch 24 formed in the other edge of the said portion 22. In this modification, the edges of the ear 23 and notch 24 are not shown as beveled, but the ear 23 is provided with a lock lip 25 that will engage a seat 26 formed by bulging the blade portion 22 at the inner edge of the notch 24. When the ear 23 is inserted in the notch 24 with the lip 25 engaged with the seat 26, the edges of the dove-tailed ear and notch will have over-and-underlapping portions that will hold the formed socket against expansion against both circumferential and radial forces. In Fig.

7, the inserted pole is indicated by the numeral 27.

From the foregoing it will be understood that the term "blade" is herein used in a broad sense to include, for example, the blade of a hoe, the blade of a sickle, the blade of a scraper, the blade of a weeder, or the toothed-equipped blade of a rake; and that the improved socket construction is applicable to various different kinds of garden tools such as above enumerated or others of similar character, wherein a socket is required for the insertion of a pole or handle.

What I claim is:

1. In a garden tool, a blade having an extended portion bent into tubular form to form a handle-receiving socket, said extended portion, at one edge, having a dove-tailed ear, and at its other edge, a dove-tailed notch, said ear having a projecting lip that underlaps the notched portion of the adjacent edge of the socket.

2. In a garden tool, a blade having an extended portion bent into tubular form to form a handle-receiving socket, said extended portion, at one edge, having a dove-tailed ear, and at its other edge, a dove-tailed notch, said ear having an edge portion that projects under an adjacent portion of the socket bordering the notch, and a handle fit snugly in said socket, engagement of the dove-tailed ear in the dove-tailed notch serving to prevent circumferential opening of the handle-receiving socket under expanding pressure exerted by the handle, said dovetailed ear being locked against radial outward movement from the notch by the over-and-underlapping engagement therebetween and the portion of the socket surrounding the notch and being held against radial inward movement from the notch by the inserted handle.

GEORGE PIRICH.